INVENTOR.
IAN N. MacKAY

Inventor

IAN N. MACKAY

United States Patent Office 3,428,523
Patented Feb. 18, 1969

3,428,523
NUCLEAR FUEL HANDLING SYSTEM
Ian Norton MacKay, Peterborough, Ontario, Canada, assignor to Canadian General Electric Company Limited, Toronto, Ontario, Canada, a corporation of Canada
Filed Nov. 16, 1966, Ser. No. 594,805
U.S. Cl. 176—32                               8 Claims
Int. Cl. G21c 19/22

ABSTRACT OF THE DISCLOSURE

To refuel while on-load a down flow vertical reactor having free standing fuel elements in stacked array within individual fuel channels, a mobile magazine is sealingly locked to the bottom of the fuel channel and the stack of elements exchanged for a replacement stack contained in the magazine.

This invention is directed to a system for handling free standing nuclear fuel arrays, and in padticular to a refuelling system for use with a bottom fuelled vertical pressure tube nuclear reactor.

Refuelling systems have previously been characterised by the complexity of mechanisms employed and the sophistication of the control means provided to ensure safety of operation.

The present invention provides a fuel handling system having a vertical refuelling machine of simplified arrangement. In the preferred embodiment the system is particularly adapted for cooperation with a bottom fuelled nuclear reactor and a bottom-access fuel sorting machine, in combination with ball valve structures providing fluid sealing access to the reactor and to the fuel sorting machine respectively.

An object of the present invention is to provide a simple and effective nuclear fuel handling system.

A further object of the present invention is to provide a system incorporating simple components having sequential mechanical interlocks to provide safe sealing interconnection between cooperating major components of the system.

A further object of the present invention is the provision of a fuel handling system incorporating a refuelling machine for sealingly coupling to improved ball valves, providing access to the pressurized fuel tubes of a nuclear reactor, and to the loading and unloading port or access of a fuel sorting machine.

Machines used in the past for loading and unloading nuclear reactors by insertion or removal of fuel slugs within the tubes of the reactor have been characterised by great complexity in order to provide accurate positioning of the machine and sequenced control of its function to ensure complete safety during the refuelling operation.

The refuelling machine according to the present invention provides a simply operated mechanically interlocked refuelling machine, providing under-fuelling for a vertical reactor.

In order to provide a highly effective seal in a zone of high neutron and gamma radiation activity where non-metallic seals are generally inoperable, it is usual to increase the sealing pressure between the metallic valve closure member and the metallic valve seat. However, this has the disadvantage that frequent operation of the valve closure member across the seat produces undue wear of one or other or both of these members. Accordingly the present invention provides a closure member movable in two modes and adapted to reduce the rubbing forces between the valve closure member and the valve seat, while at the same time providing effective sealing therebetween when in the closed condition.

In order that valves according to the present invention can be utilized at the lower end of a calandria pressure tube, to provide fuelling access thereto for an under-fuelling machine as presently described the valve is combined with an adaptor to which the refuelling machine can be locked during the refuelling process. In order that the refuelling machine may have complete access to the calandria tube, it is necessary that the passage through the valve when in the open condition shall approximate to the full internal diameter of the calandria tube.

In order that a valve according to the present invention may be operated by a refuelling machine as set forth herein the rotational axis of the valve ball member is inclined at an oblique angle to the main axis of the calandria tube, thus making it possible to provide the valve with a downwardly inclined control spindle which can be fitted into the very limited space available.

The presently disclosed fuel handling system is provided for use with vertical nuclear reactors such as that disclosed in pending United States patent application Ser. No. 594,879, filed Nov. 16, 1966, by the same inventor.

The fuel handling system thus provides a refuelling machine for fuelling and defuelling a nuclear reactor having vertically extending downwardly opening fuel tubes, comprising: an elongated vertically extending flask; transport means for moving the flask horizontally into substantial coincidence with a lower end of a selected fuel tube; lifting means to move the flask vertically into and out of engagement with a selected tube end, and flask suspension means permitting tilting of the flask from a vertical position to a position angularly inclined from the vertical in cooperation with a ball valve providing fluid sealing access to the selected fuel tube, or to a fuel handling machine for changing or rearranging selected ones of the plurality of fuel elements constituting a fuel string, whereby a fuel channel in the reactor may be selectively refuelled, while on load, and the nuclear characteristic of the fuel string may be selectively controlled.

In order that the loading machine may be used in conjunction with a liquid moderated pressure tube reactor having nuclear fuel contained within a pressure tube, the lower outlet of which is controlled by means of an outlet valve providing unrestricted access to the full bore of the tube when in the open position, the fuelling machine provides means for locking on the snout of the machine to the lower end of the tube, means to pressurize coolant within the machine to a pressure corresponding with that of the tube to which the machine is connected, means mounted on the machine to produce actuation of the pressure tube access valve, mechanical interlocking means precluding operation of the valve until the flask is satisfactorily pressurized to a level corresponding with the interior of the tube, and is thereafter operable to cause actuation of the valve to an open position, thereby providing communication between the interior of the pressure tube and the interior of the reloading machine flask.

The reloading machine includes a rotary magazine arrangement having an axis of rotation parallel with the main axis of the flask and a ram movable from a first position beneath the fuel magazine, permitting indexing of the magazine into axial alignment with the pressurized tube, the ram being then movable vertically for penetration into the pressurized tube Misalignment between the flask of the refuelling machine and the ball valve of the fuel sorting machine or of a selected reactor tube is accommodated to by tilting of the flask about its suspension means.

The following is a description by way of example of certain embodiments of the present invention, reference being had to the accompanying drawings in which.

*Refuelling machine*

Figures 1, 2:
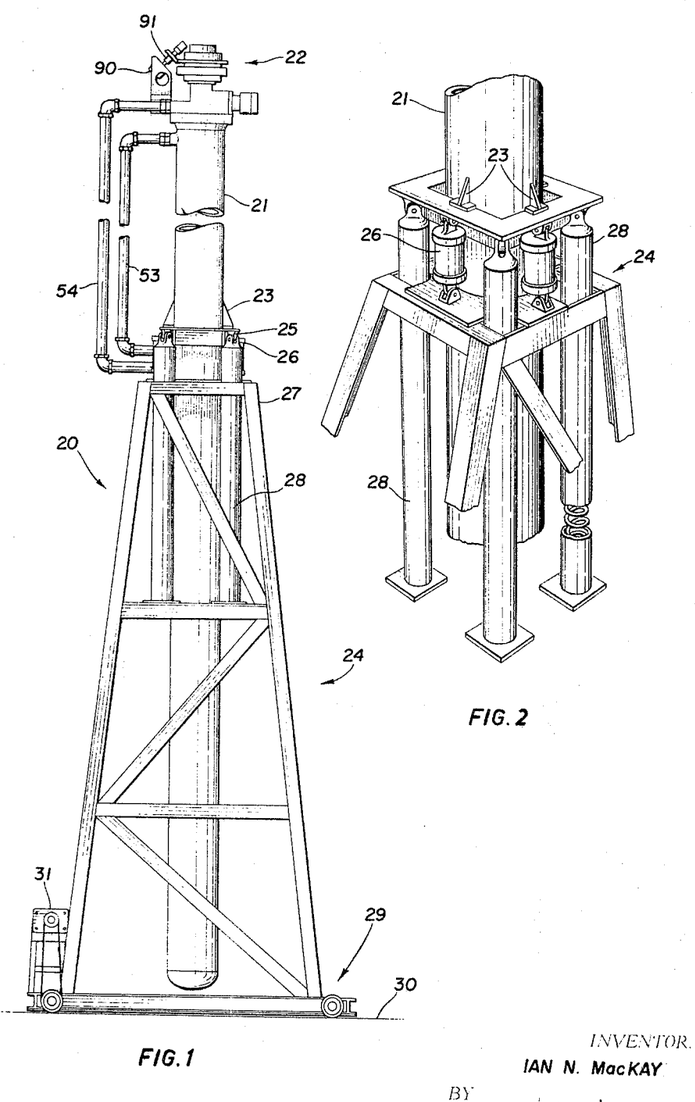
FIGURE 1 shows a side view of the refuelling machine of the system.
FIGURE 2 is a detail perspective view showing the mounting of the flask of the machine upon its support structure.

Referring to FIGURE 1 the refuelling or reloading machine 20 comprises an elongated upstanding flask 21 having a lock-on snout assembly 22 at its upper ends. The flask 21 is mounted by means of brackets 23 to the flask support means 24, comprising a lateral frame 25 mounted on a support stand 27 by means of spring loaded legs 28, a pair of hydraulic jacks 26 providing vertical adjustment of the flask 21 relative to the support stand 27.

The support stand 27 is mounted upon a wheeled carriage 29 for transverse movement in a first sense, the bridge arrangement 30 providing a transverse movement in a second direction normal to the first. A motor 31 provides a chain drive to locate the stand laterally beneath the calandria of the reactor.

Figures 3, 4:
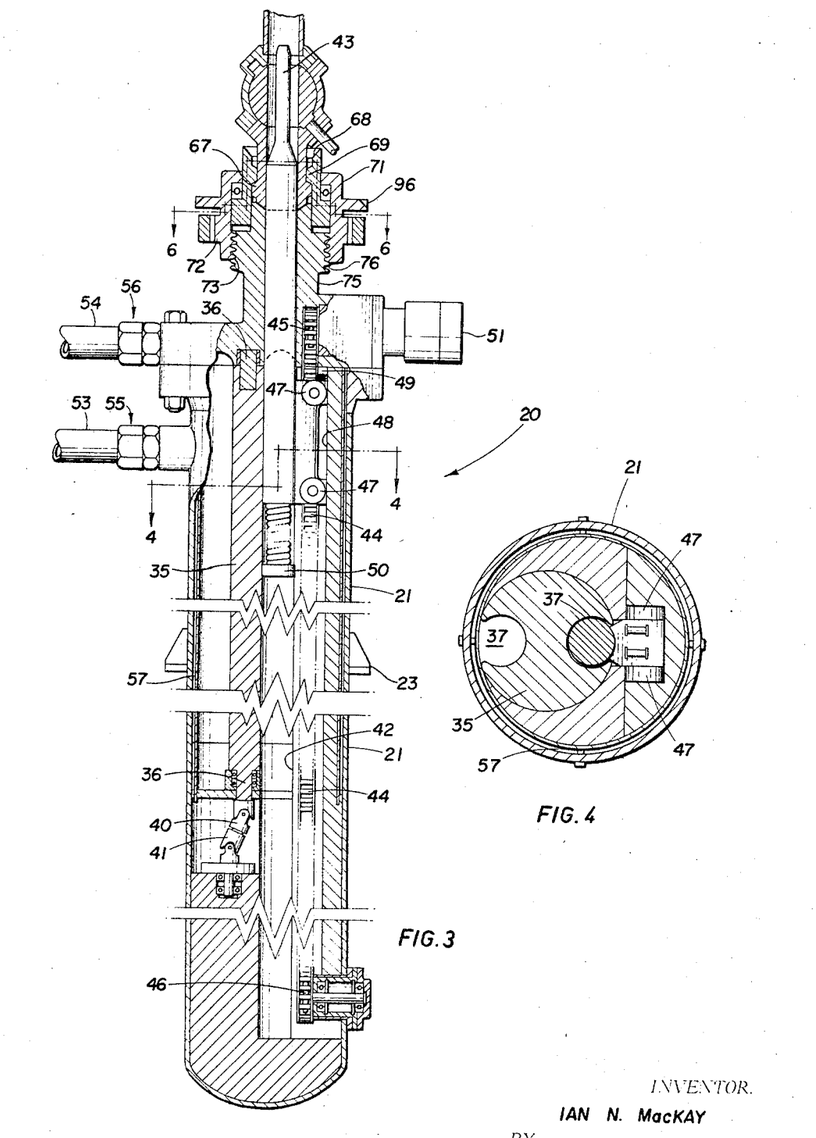
FIGURE 3 is a vertical diametral section of the flask of the machine.
FIGURE 4 is a vertical section of the flask taken on the line 4—4 of FIGURE 3.

Referring to FIGURES 3 and 4, the flask 21 which is of generally slender cylindrical form has a rotary magazine 35 rotatably pivoted about a vertical axis on upper and lower pivots 36, being shown with a pair of open-sided fuel chambers 37 extending for the length of the magazine 35. A drive shaft 40 and universal drive coupling 41 connect the magazine 35 with a hydraulic motor-driven worm gear (not shown).

The reloading machine 20 has a ram 43 located for vertical movement along the axis of the machine in channel 42. Vertical motion of the ram 43 is provided by means of a rotary hydraulic motor 51 driving a sprocket 45 in the driving connection with an endless chain 44 passing over a bottom idler 46, the chain 44 being secured to a vertical carriage having bogies 47 moving in elongated recesses 48. The upper limit of movement of bogies 47 is determined by a spring-loaded stop 49, while the ram 43 has a spring buffer 50 at its lower end.

The reloading machine 20 has a coolant circuit including external lines 53 and 54 connected to a heat dissipator (not shown). The flask coolant circuit includes an inlet 55 and an outlet 56. The inflowing coolant, which is generally the same liquid as that used to cool the calandria flows downwardly through the annular space 57 surrounding the magazine, and upwardly through the fuel chambers 37. It is contemplated that a heat dissipator may be mounted upon the refuelling machine 20, or the machine may be connected by means of umbilical hook-up with a fixed heat exchanger arrangement.

The machine 20 is adapted to be positively secured to a spherical crenelated portion (FIGURES 3, 6 and 7) of the lower end of the calandria tube or fuel sorting machine ball valve 120. The snout 22 has a mouth 68 having a plurality of circumferential recesses on its inner surface defined by teeth 69. The copper-lined snout mouth 68 is mounted in relation to a threaded portion 76 of the flask neck 75 by means of a snout mouth housing 71. The snout mouth housing 71 has an internally threaded portion 73 mounted on the threaded portion 76 of the flask neck for rotation thereabout. The snout mouth 68 is carried by the snout mouth housing 71, rotational movement between the snout mouth and its housing being effected by suitable means such as driving pins. A gear ring 72 on the external periphery of the snout mouth housing 71 is engaged by a pair of actuators 80, 83, having rack members 82, 85, respectively engaging the gear ring 72 of the snout mouth housing. Hydraulic pressure control lines 81, 81' connect with the snout locking actuator 80, which is double-acting, while pressure line 84 connects the interlock actuator 83, which is single-acting, with the flask pressurizing system.

Figure 5:
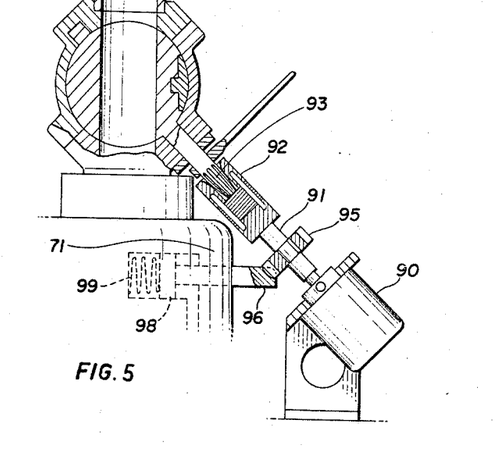
FIGURE 5 is a drawing of the tube valve opening mechanism.

Referring to FIGURE 5, this shows a mechanism for connection with the isolating valve 120 of the calandria tube, in order to provide access to the calandria tube. A hydraulic motor 90 mounted adjacent the upper end of the flask 21 is provided with an output shaft 91 having a coupling 92 adapted to engage a splined shaft 93 of the calandria tube ball valve 120. An interlock plate 95 on the shaft 91 cooperates with an interlock plate 96 attached to the machine and operated by an interlock actuator (not shown).

*Ball valve*

(Copending U.S. application Ser. No. 594,872, filed Nov. 16, 1966; MacKay et al.)

Figure 7:
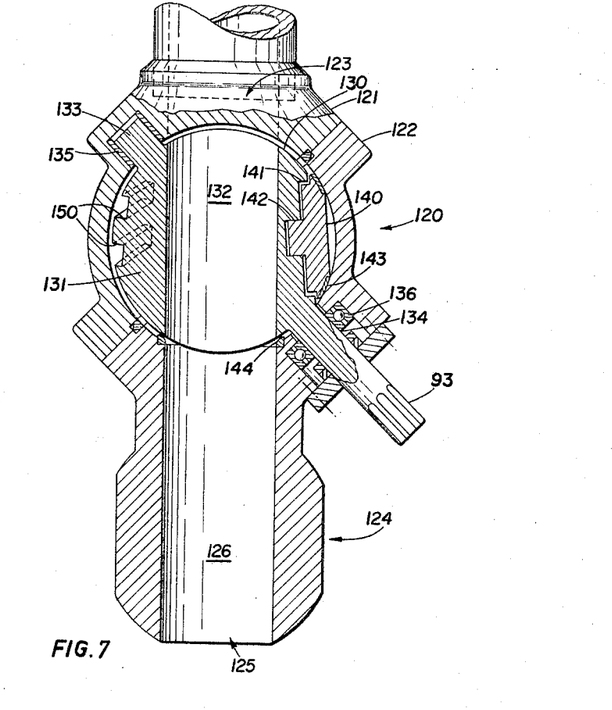
FIGURE 7 shows a sectional elevation of a tube end fitting incorporating a valve according to the present invention.

Referring to FIGURE 7 the ball valve 120 shown secured to the lower end of a tube such as a calandria tube comprises a split housing 121 and 122, the upper housing portion 121 having an outlet 123 to receive the tube, the lower housing portion 122 being shown extended to include an end fitting 124 with an inlet 125 therethrough connecting with the valve by way of a passage 126.

The valve closure means 130 comprises a substantially ball-shaped member 131 having a passage 132 extending therethrough. The ball 131 is pivotally mounted on trunnions 133, 134 mounted in bearings 135, 136, and having a splined actuating shaft 93 extending therefrom.

The valve closure member 140 is shown slidably mounted in recess 142 of the ball 131, being capable of sliding motion radially outwardly of the ball and of taking up some angular misalignment permitted by clearance at 141, and having an annular metallic sealing ring 143 of relatively soft material such as nickel on an outer surface adapted to be brought into sealing contact with a seat 144 at the inlet to the valve lower housing 122. The annular seat 144 is of a generally hard material such as Stellite, secured to the valve inlet as by welding or weld deposition.

It will be seen that rotation of the valve control shaft 93 will move the valve ball 131 from the open position illustrated wherein the passage 132 constitutes an extension of the tube inner surface, providing clear connection with the passage 126, to a closed position wherein the closure member 140 slides across the valve inlet seat 144 so that in the closed position the seal ring 143 is pressed into tight sealing contact with the Stellite seat 144.

Under operating conditions typical of a nuclear reactor, the calandria tube is a pressure tube operating at a pressure in the order of 1500 pounds per square inch, containing a coolant liquid such as heavy water. The pressure of the coolant within the tube forces the closure member 140 to seal tightly upon the seat 144, the seal ring 143 and the seat 144 having lapped finishes. The shape of the seat 144 is such that the unit contact pressure between the ring 143 and seat 144 approaches the yield strength of the material of the ring 144 under operating conditions.

In order to open the valve 120 in a manner to avoid scoring the seal ring 143, the closure member 140 is lifted off its seat as by the application of hydraulic pressure to the underface thereof by way of the valve inlet 125. Upon equalization of the pressure at the inlet with that at the outlet of valve 120, it is then possible to rotate the control shaft 93 and move the valve into the open position without producing undue wear upon the seal ring 143, the member 140 being free to slide lightly in a wiping motion across the valve seat 144.

Figure 8:
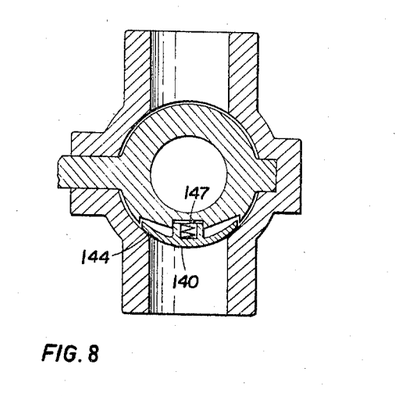
FIGURE 8 shows a portion of a valve and closure member having a modified seating arrangement.
Figure 9:
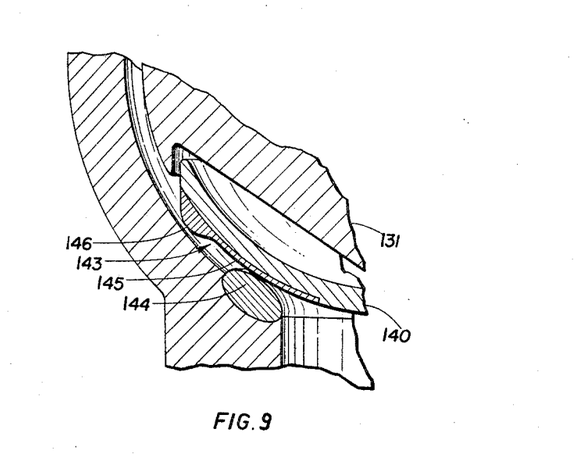
FIGURE 9 is an enlarged view of a portion of FIGURE 8.
Figure 10:
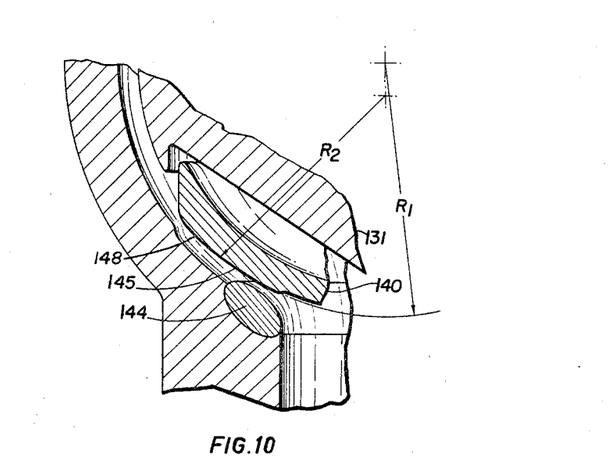
FIGURE 10 shows an alternative embodiment to that illustrated in FIGURE 8.

In the embodiment illustrated in FIGURE 8, the closure member 140 has a closure spring 147 acting thereagainst. Referring to FIGURE 9 it will be seen that the Stellite seat 144 comes in sealing contact with a smooth portion 145 of the seal ring 143, while in intermediate positions movement of the closure member 140 produces rubbing contact of the raised annular rib 146 of the seal ring 143 against the inner faces of the valve housing 122. Thus undue wear of the soft seal ring 145 is precluded. Referring to FIGURE 10 this alternative arrangement shows the use of a seal surface 145 having a relatively large radius of curvature R1, and a rubbing surface 148 lying radially outwardly thereof having a shorter radius of curvature R2 adapted to provide a protective clearance of the seal ring surface 145. This latter embodiment facilitates the lapping of the closure member 140 to the Stellite seat 144 of the valve inlet, or to a lapping tool of appropriate curvature.

Referring to the ball 131 illustrated in FIGURE 7, one or more grooves 150 on the upper portion of the ball are adapted to interlock with roller or ball bearings projecting downwards from and forming part of the shielding plug used to support nuclear fuel slugs, situated in the tube secured to valve outlet 123. While the ball 131 is free for limited rotation in an opening direction to provide access through the valve so as to admit a probe portion of the refuelling machine disclosed in the aforementioned copending application, the ball 130 may not move to its fully open position until the shielding plug bearings resting in the slots 150 have been raised from their interlocking contact by the inserted probe.

Owing to the beneficial wiping action of the closure member 40 across the inlet seat 44, the deposition of solids which might cause valve fouling is minimized.

*Fuel handling machine*

Figures 11, 12, 13:
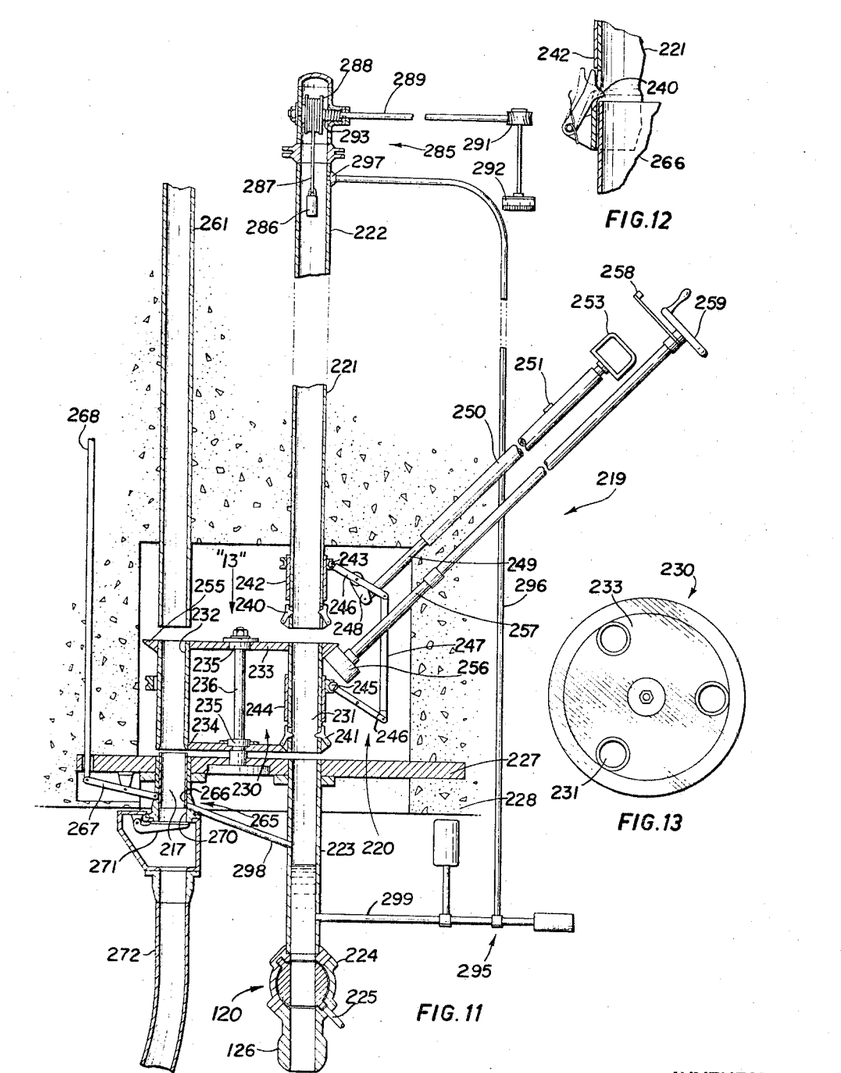
FIGURE 11 is a composite sectional elevation of the fuel handling machine.
FIGURE 12 is an enlarged view of a portion of FIGURE 11.
FIGURE 13 is a plan view taken in the direction of arrow "13" of FIG. 11.

Referring to FIGURES 11, 12, and 13, the fuel handling machine 219 is erected in conjunction with a shielded chamber 220 to minimize radiation from the machine. The machine comprises a nuclear fuel receiving tube 221 having an upper portion 222 and a lower portion 223. Access to the lower portion 223 is provided by way of an access ball valve 224 having a downwardly pointing control shaft 225 and an attachment nosepiece 126, the nosepiece 126 and control shaft 225 being adapted to cooperate with the refuelling machine.

The shield chamber 220 is bounded by a bottom shield plate 227 and concrete walls 228 which may be water-cooled. The receiving tube lower portion 223 projects downwardly from the chamber bottom plate 227.

Within the chamber 220 of the machine 219 a fuel changer magazine 230 is located, illustrated as having three chambers (FIGURE 13). The magazine has a top wall 233, a bottom wall 234, and is supported by upper and lower bearings 235 mounted on a support shaft 236.

In the illustrated embodiments the fuel receiving tube 221, the fuel dispensing tube 261 and the fuel discharge or exit tube 217 are mutually located at 120°, considered in plan view. Thus, the three magazine chambers shown in FIGURE 13 come into coincidence with the related fuel handling tubes when one of the magazine chambers is aligned with one of the tubes.

The fuel receiving tube 221 is equipped with fuel retaining upper latches 240 in the tube upper portion 222, having an upper latch locking tube 242 and an annular actuating collar 243, while the intermediate portion of the fuel receiving tube formed by the magazine chamber 231 (FIGURE 11) includes lower fuel retaining latches 241 and a lower locking tube 244 together with a locking tube actuating collar 245.

The fuel retaining latches 240, 241, are controlled by way of spring-loaded latch control rods 246 engaging with the actuating collars 243, 245, respectively. The upper and lower control rods 246 are connected together by a connecting link 247 to which is secured a crank 248. A push-pull control rod 249 connected with the crank 248 for angular positioning thereof is guided in a sleeve 250, and has a key 251 adapted to be secured in an upper or a lower locked position of a slot (not shown).

The angular positioning of the rotary magazine is effected by gear ring 255 driven by a control pinion 256 through a drive shaft 257 to which is attached a position indicator 258 and an operating handle 259.

The fuel discharge station 265 (FIGURE 11) includes a latch opening tube 266, the position of which is controlled by a pivoted control arm 267, actuated by a push-pull control rod 268. The discharge station 265 includes a fuel exit tube 270 having a spring loaded flat valve 271 at the lower end thereof providing access to a transport pipe 272 for transporting the spent nuclear fuel to fuel storage bay.

The position of a nuclear fuel string within the receiving tube 221 is given on a dial indicator 292. An indicator contact weight 286 is suspended from a winder drum 288 by means of a suspension cord 287, the drum being spring driven in a wind-up direction in order to take up the slack of the cord 287 by means of a relatively weak spring 293. The position of the contact weight 286 within the tube 222 is transmitted by way of indicator drive shaft 289 to gear 291 through a worm gear (not shown), the gear 291 driving a fuel string position indicator 292.

A coolant supply system 295 comprises a header pipe 296 supplying a spray nozzle 297. The coolant herein disclosed is deuterium, and the system 295 includes a level controller and a circulating pump with heat exchanger. The system also includes a drain pipe 298 leading from the fuel exit tube 270 to the lower portion 223 of the fuel receiving tube, and thence by way of the return pipe 299 back into the coolant system.

*Refuelling machine operation*

Figure 6:
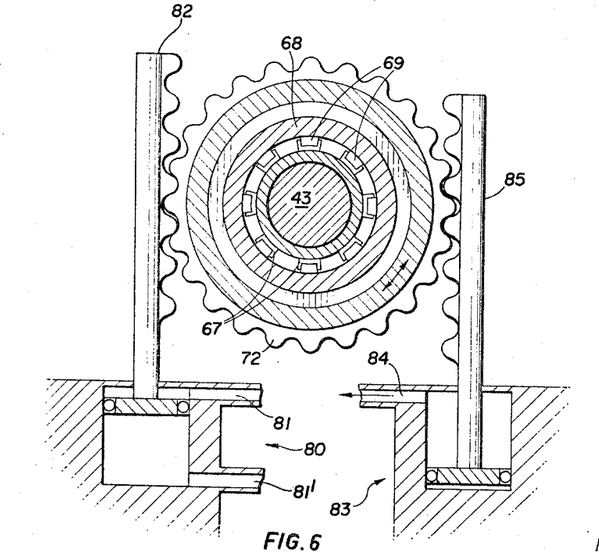
FIGURE 6 is a part section on the line 6—6 of FIGURE 3, showing the snout lock-on and interlocking arrangement.

In order to withdraw a column of nuclear fuel slugs contained in stacked array within a calandria tube, in order to substitute therefor a replacement fuel stack located within a fuel chamber 37 of the refuelling machine magazine 35, the following procedure is followed:

The refuelling machine 20 is moved into an approximate position beneath the selected calandria tube to be refuelled, by way of carriage drive motors such as the electric motor 31, and a corresponding motor (not shown) driving the bridge member 30. When in position beneath the selected tube, actuation of the vertical jacks 26 moves the flask 21 upwardly until the snout 22 slides over the toothed ends 67 of the calandria tube end fitting 120. The copper-lined snout mouth receives the end fitting in sealing relation therewith, and the snout mouth housing 71 is moved into locked engagement over the snout teeth 69 by admission of pressure hydraulic fluid to the connection 81' of the double-acting snout-locking actuator 80, thus moving the snout mouth housing 71 in a clockwise direction (FIGURE 6). This clockwise movement also serves at the same time to move the snout mouth housing 71 downwardly by engagement between the threaded portions 73, 76, thus transferring a portion of the weight of the refuelling machine to the calandria tube end fitting 120. During this locking action, the snout mouth gear ring 72 drives the rack 85 of the interlock mechanism 83 to the position shown in FIGURE 6.

Before opening the tube end fitting valve, to provide access to the calandria tube, the cooling system of the refuelling machine is first pressurized to a pressure approximately equal to the pressure existing within the calandria tube (generally in the order of 400 to 500 pounds per square inch). In addition to ensuring that the refuelling machine is completely filled with cooling liquid, the sealing of the snout to the lower end fitting is also checked by the application of pressure, while the pressurized fluid admitted by the connection 84 to the interlocking actuator 83 ensures that the snout cannot be unlocked from the tube fitting while the reloading machine is pressurized, the effective cross-sectional area of the actuator 83 being greater than the effective cross-sectional area of the actutor 80, in relation to the operating pressures.

Pressurization of the flask 21 also operates on an interlock actuator 98 shown in phantom (FIGURE 5) to withdraw the interlock plate 96 against the pressure of a spring 99, to permit rotation of the tube isolating valve by the shaft 91 of the hydraulic motor 90. Admission of pressurizing fluid to the hydraulic motor 90 produces rotation of the coupling 92, to drive the valve in an opening direction.

Operation of the hydraulic motor 51 of the ram mechanism produces rotation of the chain 44, causing the bogies 47 to move upwardly in the recess 48, and guiding the top end of the ram 43 upwardly through the opened valve into the calandria tube. The reduced, or necked-down upper portion of the ram 43 is adapted to penetrate through the partly open valve to be brought into supporting relation with the nuclear fuel stack within the calandria tube before the support of the valve is withdrawn therefrom. Retraction of the ram 43, once the valve is locked in the fully-opened position permits the stack of fuel to be lowered downwardly from the tube, through the valve and tube end fitting, downwardly into one of the fuel chambers 37 in registry with the calandria tube. Owing to the reduced section of the ram 43, it is then possible to partially rotate the magazine 35 about its vertical axis on pivots 36, to transfer the load of the withdrawn nuclear fuel to the magazine structure. Complete retraction of the ram 42 then permits the new fuel charge within the opposite fuel chamber 37 to be brought into index with the calandria tube, the upper end of the ram 43 being inserted within the partially registered fuel chamber 37 before full registry is effected, in order to transfer the load of the new stack of fuel elements to the ram 43.

The sequence of events is then carried out in reverse order, thus providing refuelling of the engaged tube, while maintaining the refuelling machine in locked relation thereto until the operation is complete and the calandria tube is safely isolated in its original condition.

Upon release of the pressure within the flask, the interlocking actuator 83 can then be overcome by the locking actuator 80 operating in the reverse sense to unlock the snout.

*Fuel handling machine operation*

In operation, a string of nuclear used fuel is brought to the fuel handling machine, from the reactor, in the refuelling machine, which is secured to the fuel handling machine by way of the ball valve nose piece 126, and when the two machines are securely interlocked, the ball valve 224 is opened by rotation of the control shaft 225 which is energized by the refuelling machine.

A hot string, including spent fuel elements which are to be replaced is moved upwardly through the ball valve 224 into the receiving tube 221, being so vertically positioned that a fuel element to be removed is supported by the lower fuel latches 241, while the preceding portion of the fuel string is supported by the upper fuel latches 240.

With the elements of the fuel string in the desired positions, operation of the latch locking handle 253 produces a downward motion of the latch locking tubes 242, 244, thus locking the fuel elements in their respective positions.

It should be mentioned here that positioning of the fuel string within its tubes is facilitated by use of the fuel position indicator, which shows where the top of the uppermost fuel element is located, or may be graduated to show by number which fuel element is within the fuel changer magazine 230.

Rotation of the magazine clockwise as viewed in FIGURE 13 traverses the magazine 231 together with its unit of used fuel into registry with the fuel discharger station 265, while the other stations of the handing machine are correspondingly aligned with magazine chambers, thus providing access through the magazine.

Downward actuation of the control rod 268 raises the latch opening tube 266 to open the latches 241 so that the fuel element falls downwardly into the exit tube 270, from whence it is released by way of the spring loaded flap valve 271 for transport to the used fuel storage bay through the pipe 272.

Reverse downward movement of the control rod 268 releases the latches 241 which return inwardly under action of their return springs, while the magazine is now free to rotate clockwise to a further position.

By use of the control handle 259, the magazine 230 is indexed so that the chamber 231 is brought into axial correspondence with the new fuel passage or port 261, down which a replacement fuel element is lowered by suitable means such as by hand using a simple tool comprising an external tube having a latching finger at its lower end, whereby the replacement fuel element can be gently and accurately positioned within the magazine chamber 231 in supported relation with the latches 241.

Further rotation of the fuel magazine by one-third of a full turn clockwise brings the replacement fuel slug into index with the upper and lower portions 222, 223 of the fuel receiving tube 221. In all angular positions of the magazine 230 the lower latch control rod 246 remains engaged in the recess of the annular actuator collar 245, which extends about the outer periphery of the magazine 230.

Upward motion of the ram 43 (FIGURE 3) of the refuelling machine raises the newly added fuel element upwardly into contact with the rest of the fuel string. Release of the upper and lower latches by reverse movement of the latch release sleeve control handle 253 withdraws the latches so that the replenished fuel string can then be returned to the refuelling machine for transport and replacement within the nuclear reactor.

The provision of corresponding station holds through the magazine as shown in FIGURE 13 permits limited repositioning of the balance of the fuel string relative to the new element which is being added, in order to provide flexibility of operation and optimum utilization of the fuel.

The heavy water coolant is collected at the bottom portion 223 of the receiving tube, the rate of spray being controlled in order to prevent the temperature of the irradiated string rising to a destructive or dangerous level. There is no cooling provision necessary in the refuelling port 261, as the new fuel is physically and radioactively cold, while at the discharge station the transference of cooling heavy water through the spring loaded valve 271 is avoided to the fullest possible extent, in order to conserve the heavy water, which is expensive.

While the foregoing disclosure relates to a system associated with a heavy water moderated vertical nuclear reactor, it will be understood that the system components are suitable for use with alternative arrangements.

What I claim as new and desire to secure by Letters Patent of the United States is:

1. A nuclear refuelling system for the remote handling of nuclear fuel for a pressurized, liquid cooled nuclear reactor, comprising; a refuelling machine having magazine means for receiving and discharging at least one string of stacked fuel elements; magazine operating means for positioning the magazine means relative to the machine in fuel receiving and discharging relation; means for positioning the refuelling machine at a first location in relation with the fuel tubes of said nuclear reactor, and at a second location in relation with the fuel receiving and discharge port of a fuel sorting machine adapted to receive, rearrange and discharge said fuel element string; closure means extending from said reactor fuel tubes and from an access port of the sorting machine providing access thereto, having closure actuator means mounted thereon in cooperating relation with said refuelling machine, refuelling connection means mounted on said closure means to receive a nozzle portion of the refuelling machine in substantially aligned sealing relation with the access port, and interlock means ensuring sequential operation of said connection means and said closure means, whereby substantially leak free fuel unloading, reloading and sorting may be accomplished.

2. A nuclear refuelling system as claimed in claim 1 for use with a downflow liquid-moderated pressure tube nuclear reactor having provision for under-fuelling wherein said tube closure means comprise tube lower end fittings having pressure isolating valves and a lock-on fitting for securing the fuelling machine thereto, said refuelling machine including a flask having an open snout at the upper end thereof, and a fuel passageway extending downwardly therethrough, said nuclear fuel magazine means being mounted within said flask to receive a plurality of fuel elements; cooling means for cooling the interior of said flask; said machine positioning means including flask positioning means for positioning said flask beneath a selected one of said calandria tube end fittings, and means to raise the flask upwardly whereby said snout engages the lower end of said fitting, said flask positioning means being adapted to conform to slight misalignment between the flask and the fitting; said interlock means for locking said snout to said tube end fitting including means to pressurize the interior of said flask; means to activate said tube isolating valve on pressurization of said flask; said magazine means including means within said flask to receive a stack of fuel elements from within a said tube and to provide a substitute stack of fuel elements for replacement therein, said interlock means being operated by the operation of the machine to maintain the sequence of machine operations commensurate with safety and leak free fuel replacement.

3. A nuclear refuelling machine as claimed in claim 2 wherein said fuel changing means comprises platform means within said flask movable axially therein within said magazine, to penetrate through said valve into the calandria pressure tube or the fuel sorting machine in supporting engagement with nuclear fuel therein, and movable downwardly therefrom to withdraw the fuel to the magazine.

4. A nuclear refuelling machine as claimed in claim 3 wherein said magazine is rotatable, having at least two fuel containment chambers extending vertically therethrough, said platform means having a nose portion of reduced cross-section adapted to provide support to said nuclear fuel in intermediate positions of the machine and of the tube end valve.

5. A nuclear refuelling machine as claimed in claim 4 wherein said interlock means includes a snout lock adapted to maintain said snout in an engaged and locked position relative to said tube end fitting while the interior of said flask is pressurized.

6. A nuclear refuelling system as claimed in claim 1, wherein said fuel sorting machine comprises containment means to receive an elongated string of fuel elements from said refuelling machine; first securing means to secure selected ones of said fuel elements within a first portion of said containment means; second securing means to secure at least a selected one of said fuel elements within a second portion of said containment means; means to remove said at least one selected fuel element; means to add at any selected position in the string at least one replacement element; means to cool said nuclear fuel elements within said machine; and means to release said first and said second securing means to permit reassembly of the fuel string with said replacement element whereby the reassembled string is positioned for withdrawal from the sorting machine into the refuelling machine.

7. The method of operating a nuclear refuelling system in cooperation with a pressurized liquid cooled nuclear reactor having a plurality of pressure tubes each containing a stack of fuel elements, the components of the system including a fuel sorting machine adapted to receive and discharge a stack of fuel elements, for removing, adding and rearranging the elements of the stock, closure valve means providing sealed access to the pressure tubes of the reactor and to the sorting machine, and a refuelling machine selectively moveable between a first position in aligned sealing relation with a selected pressure tube and a second position in aligned sealing relation with the fuel sorting machine, comprising the steps of; sealingly attaching the refuelling machine to a selected reactor tube; pressurizing the refuelling machine with liquid coolant similar to that of the reactor; opening the tube closure valve and removing the stack of fuel elements from the tube for transfer to the sorting machine; replacing at least one element and rearranging said fuel elements in the sorting machine; and transferring the rearranged element stack to the reactor by way of the refuelling machine, for reinsertion thereinto, whereby substantially exhausted fuel is replenished, and the pattern of flux distribution in the reactor is controlled.

8. The method as claimed in claim 7 including the steps of mechanically interlocking said refuelling machine to said reactor closure member, and to the closure member of said sorting machine, when in the attached condition, and passing a ram member of the refuelling machine through said valve when locked in the partially open position, to transfer the load of said stack of elements between the refuelling machine and the closure member.

References Cited
UNITED STATES PATENTS
3,137,397    6/1964    Nicoll et al. _____________ 176—30

FOREIGN PATENTS
840,882    7/1960    Great Britain.
866,541    4/1961    Great Britain.
216,210    12/1956    Australia.

CARL D. QUARFORTH, *Primary Examiner.*

H. E. BEHREND, *Assistant Examiner.*